(12) United States Patent
Park et al.

(10) Patent No.: US 9,851,859 B2
(45) Date of Patent: Dec. 26, 2017

(54) TOUCH WINDOW AND TOUCH DEVICE INCLUDING THE SAME

(71) Applicant: LG INNOTEK CO., LTD., Seoul (KR)

(72) Inventors: Soung Kyu Park, Seoul (KR); Ji Chang Ryu, Seoul (KR); Do Youb Kwon, Seoul (KR); Mun Suk Kang, Seoul (KR); Gyu Rin Lee, Seoul (KR); Jin Seok Lee, Seoul (KR); Jae Hak Her, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 20 days.

(21) Appl. No.: 14/333,255

(22) Filed: Jul. 16, 2014

(65) Prior Publication Data

US 2015/0022492 A1   Jan. 22, 2015

(30) Foreign Application Priority Data

Jul. 16, 2013  (KR) .................... 10-2013-0083659
Sep. 16, 2013  (KR) .................... 10-2013-0111414

(51) Int. Cl.
 *G06F 3/044* (2006.01)
 *G06F 3/045* (2006.01)

(52) U.S. Cl.
 CPC .............. *G06F 3/045* (2013.01); *G06F 3/044* (2013.01); *G06F 2203/04103* (2013.01); *G06F 2203/04112* (2013.01)

(58) Field of Classification Search
 CPC ......... G06F 2203/04103; G06F 3/0488; G06F 3/0416; G02F 1/13338
 See application file for complete search history.

(56) References Cited

U.S. PATENT DOCUMENTS

| | | | |
|---|---|---|---|
| 6,378,199 B1 * | 4/2002 | Yoshinuma | H05K 3/0023 174/261 |
| 9,541,578 B2 | 1/2017 | Shimada et al. | |
| 2009/0104440 A1 * | 4/2009 | Nashiki | C08J 7/045 428/336 |
| 2011/0192633 A1 | 8/2011 | Allemand | |
| 2011/0193793 A1 * | 8/2011 | An | G06F 3/044 345/173 |
| 2011/0253668 A1 | 10/2011 | Winoto et al. | |
| 2012/0088189 A1 | 4/2012 | Miyagishima et al. | |

(Continued)

FOREIGN PATENT DOCUMENTS

DE  20-2012-104599 U1  12/2012
KR  10-2012-0038438 A   4/2012

(Continued)

OTHER PUBLICATIONS

European Search Report dated Dec. 3, 2014 in European Application No. 14-17-7166.

(Continued)

*Primary Examiner* — Bryan Earles
(74) *Attorney, Agent, or Firm* — Saliwanchik, Lloyd & Eisenschenk

(57) ABSTRACT

Disclosed is a touch window including a substrate, and an electrode part provided on the substrate to detect a position. The electrode part includes a base including an electrode.

20 Claims, 19 Drawing Sheets

(56) References Cited

U.S. PATENT DOCUMENTS

| | | | |
|---|---|---|---|
| 2012/0127387 A1* | 5/2012 | Yamato | G06F 3/044 |
| | | | 174/250 |
| 2012/0313864 A1 | 12/2012 | Cheng et al. | |
| 2012/0327021 A1* | 12/2012 | Ryu | G06F 3/044 |
| | | | 345/174 |
| 2013/0016049 A1* | 1/2013 | Eom | H01L 27/323 |
| | | | 345/173 |
| 2013/0129465 A1 | 5/2013 | Okazaki et al. | |
| 2013/0135231 A1 | 5/2013 | Park et al. | |
| 2013/0155059 A1* | 6/2013 | Wang | G06F 3/044 |
| | | | 345/419 |
| 2013/0201348 A1* | 8/2013 | Li | G06F 3/044 |
| | | | 348/174 |
| 2013/0255996 A1* | 10/2013 | Akieda | H05K 1/0298 |
| | | | 174/250 |
| 2014/0055379 A1 | 2/2014 | Ma et al. | |
| 2014/0299359 A1* | 10/2014 | Mittal | H01L 31/022466 |
| | | | 174/251 |

FOREIGN PATENT DOCUMENTS

| | | |
|---|---|---|
| KR | 10-2013-0002320 A | 1/2013 |
| KR | 10-2013-0060779 A | 6/2013 |
| WO | WO-2012/147659 A1 | 11/2012 |

OTHER PUBLICATIONS

Decision to Refuse dated May 24, 2017 in European Application No. 14177166.7.

* cited by examiner

TOUCH WINDOW AND TOUCH DEVICE INCLUDING THE SAME

CROSS-REFERENCE TO RELATED APPLICATIONS

This application claims the benefit under 35 U.S.C. §119 of Korean Patent Application Nos. 10-2013-0083659, filed Jul. 16, 2013, and 10-2013-0111414, filed Sep. 16, 2013, which are hereby incorporated by reference in their entirety.

BACKGROUND

The disclosure relates to a touch window and a touch device including the same.

Recently, a touch panel, which performs an input function through the touch of an image displayed on a touch device by an input device, such as a stylus pen or a hand, has been applied to various electronic appliances.

The touch panel may be typically classified into a resistive touch panel and a capacitive touch panel. In the resistive touch panel, the position of the touch point is detected due to the short between glass and an electrode when pressure is applied to an input device. In the capacitive touch panel, the position of the touch point is detected by detecting the variation in capacitance between electrodes when a finger of the user is touched on the capacitive touch panels.

For the electrode of the touch panel, a nanowire, which is a material substituted for indium tin oxide (ITO), has been spotlighted. The nanowire is a material superior to ITO in various aspects such as transmittance and conductivity.

Nonowires have a characteristic of scattering incident light thereto, so that an electrode including the nanowires may be opaquely viewed. Accordingly, the visibility of the touch panel may be degraded. In addition, when the electrode is formed by using the nanowire, an overcoating layer is additionally required to prevent the nanowire from being oxidized, which increases the thickness of the touch panel.

In addition, when the touch panel is patterned, the same materials are contained in the electrode, so that the selective patterning is difficult. In other words, different types of patterns must be formed in patterning, but the same materials are used in the patterning, so that one patterning process exerts an influence on another patterning process. Accordingly, the limitation in the structure of the touch panel is made.

BRIEF SUMMARY

The embodiment provides a touch window having a thin thickness and a touch device including the same.

The embodiment provides a touch window, in which various structures can be ensured, and a touch device including the same.

According to the embodiment, there is provided a touch window including a substrate, and an electrode part provided on the substrate to detect a position. The electrode part includes a base including an electrode.

As described above, the touch window according to one embodiment includes an electrode part including the photosensitive material and the nanowire. The electrode part includes the nanowire film, so that the thickness of the electrode part may be reduced. In other words, the electrode part includes the nanowire, and the whole thickness can be reduced. According to the related art, when the electrode part includes the nanowire, the overcoating layer is additionally formed to prevent the nanowire from being oxidized. Accordingly, the fabricating process is complicated and the thickness of the touch window is increased. However, according to the present embodiment, the nanowire is contained in a photosensitive material, so that the nanowire can be prevented from being oxidized without the overcoating layer.

In addition, the electrode part includes the nanowire, so that the flexible touch window and the touch device can be realized.

According to the touch window of the embodiment, the difference in height between the electrode and an area in which the electrode is not formed can be reduced, so that the visibility of the electrode can be improved. In addition, when the electrode film is bonded, bubbles resulting from a step difference can be reduced, so that the reliability of the touch window can be improved.

In addition, when the wire connected with the electrode part is withdrawn, the step difference of the wire resulting from the thickness of the electrode part can be improved, thereby preventing the wire from being shorted or cracked.

DETAILED DESCRIPTION

Figure 1:
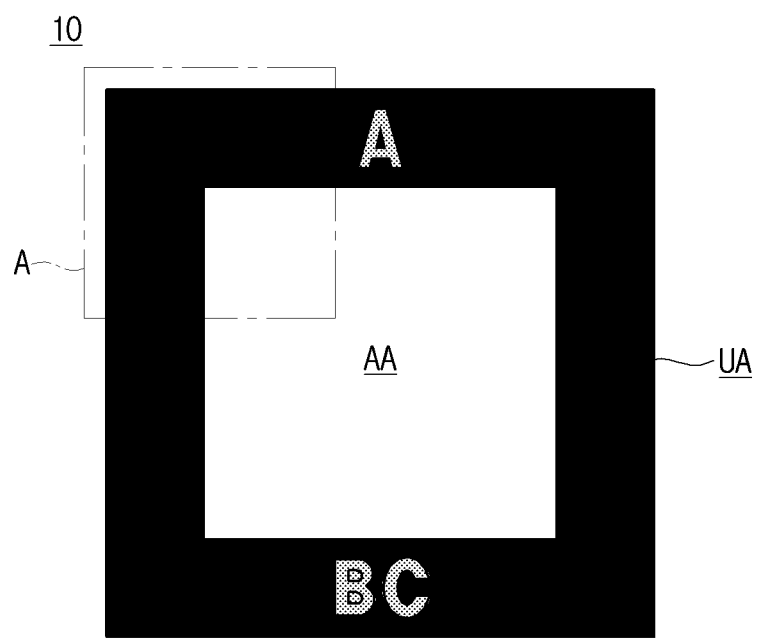
FIG. 1 is a plan view schematically showing a touch window according to the embodiment.

In the description of the embodiments, it will be understood that, when a layer (or film), an area, a pattern, or a structure are referred to as being "on" or "under" another substrate, another layer (or film), another area, another pad, or another pattern, it can be "directly" or "indirectly" on the other substrate, layer (or film), area, pad, or pattern, or one or more intervening layers may also be present. Such a position of the layer has been described with reference to the drawings.

The thickness and size of each layer (or film), each area, each pattern, or each structure shown in the drawings may be exaggerated, omitted or schematically drawn for the purpose of convenience or clarity. In addition, the size of elements does not utterly reflect an actual size.

Hereinafter, the embodiment of the present invention will be described with reference to accompanying drawings.

Hereinafter, a touch window according to one embodiment and a method of fabricating the same will be described with reference to FIGS. 1 to 8.

Figure 2:
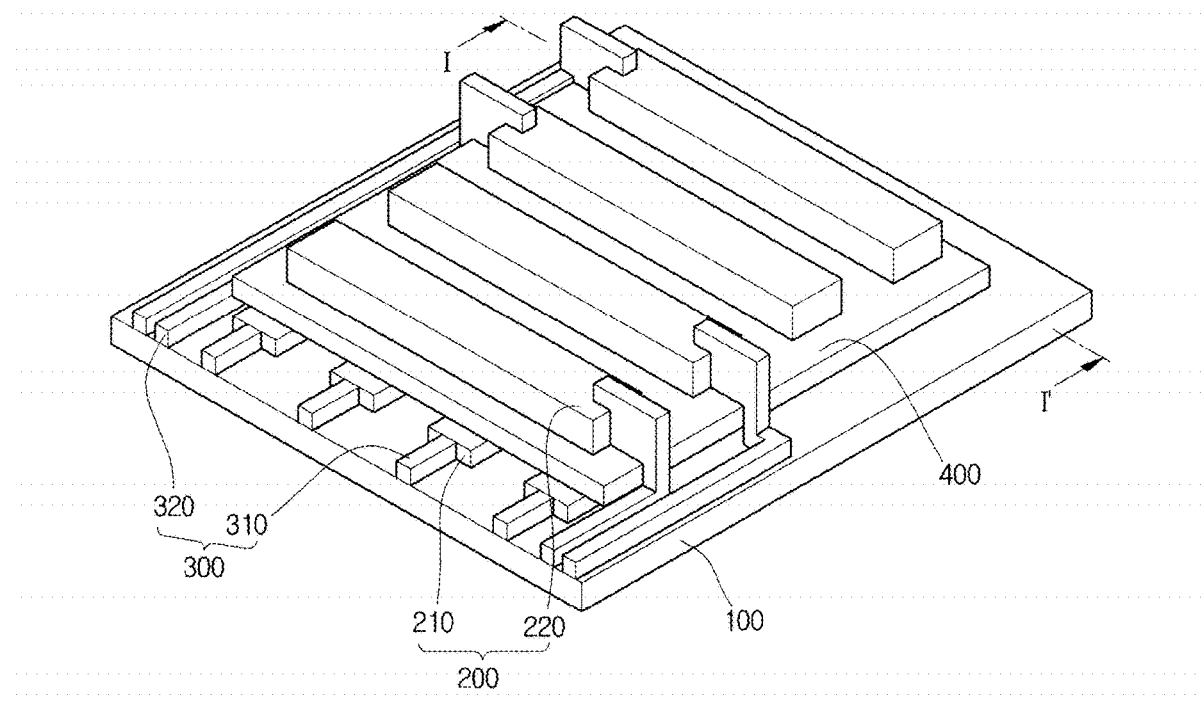
FIG. 2 is a perspective view showing the touch window according to the embodiment.

Referring to FIGS. 1 and 2, a touch window 10 according to the embodiment includes a substrate 100 having an active area AA, in which a position of an input device (e.g., finger) is detected, and an unactive area UA provided at a peripheral portion of the active area AA.

The substrate 100 may include a glass substrate or a plastic substrate including polyethylene terephthalate (PET) film or resin, but the embodiment is not limited thereto. In other words, the substrate 100 may include various materials to form an electrode part 200 and a wire 300 thereon.

The active area AA may be provided therein with the electrode part 200 that may sense the input device. The electrode part 200 has the shape of a bar as shown in FIG. 2, but the embodiment is not limited thereto. Accordingly, the electrode part 200 may have various shapes to detect if an input device such as a finger is touched.

The electrode part 200 includes a first electrode part 210 extending in one direction and a second electrode part 220 extending in an opposite direction crossing in the one direction. The touch window according to the embodiment may have one-layer structure in which the first and second electrode parts 210 and 220 are formed on the same substrate 100. In other words, and the first and second electrode parts 210 and 220 may be provided on the same plane on the substrate 100. However, the embodiment is not limited thereto, and the touch window may have various structures including a two-layer structure in which the first and second electrode parts 210 and 220 are formed on different substrates from each other.

If the input device such as a finger is touched on the touch window, the difference in capacitance is made on a touched portion by the input device, and the touched portion representing the difference in the capacitance may be detected as a touch point.

Meanwhile, although not shown in FIGS. 1 and 2, a cover window may be provided on the substrate 100. The cover window may include glass. In detail, the cover window includes chemical tempered glass. The chemical strengthening glass refers to glass that is chemically strengthened. For example, the chemical strengthening glass may include soda lime glass ($Na_2O$—$CaO$—$SiO_2$) or aluminosilicate glass ($Na_2O$—$Al_2O_3$—$SiO_2$). The cover window may have a predetermined angle to protect the substrate 100, the electrode part 200, and a wire 300.

Figure 3:
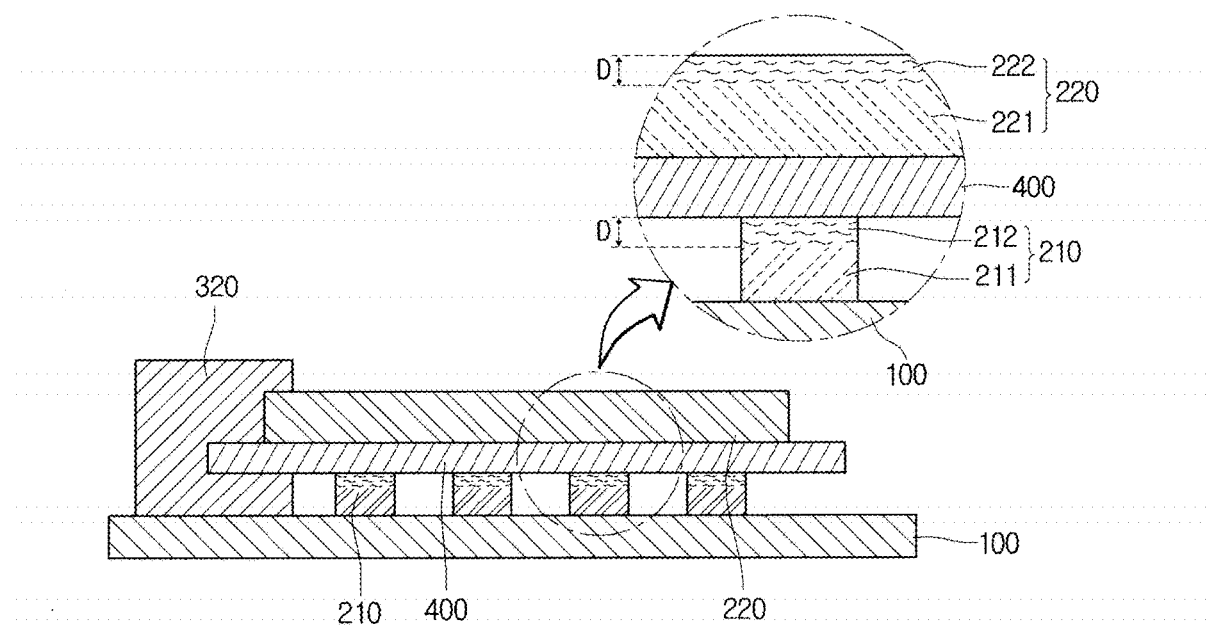
FIG. 3 is a sectional view taken along line I-I' of FIG. 2.

Referring to FIG. 3, the first electrode part 210 includes a base 211 and an electrode 212 provided on the base 211. The electrode 212 substantially performs an electrical function at an upper portion of the base 211.

The base 211 and the electrode 212 have the same pattern. In other words, when the first electrode part 210 has a bar-shaped pattern extending in one direction, the base 211 and the electrode 212 have bar-shaped pattern extending in the one direction.

The base 211 includes a photosensitive material. The base 211 includes the photosensitive material, so that the first electrode part 210 may be formed through an exposure and development process.

The electrode 212 may include an interconnecting structure. The interconnecting structure may have a fine structure having a diameter in the range of 10 nm to 200 nm. Preferably, the interconnecting structure may be a fine structure having the diameter in the range of 20 nm to 100 nm. In this case, the electrode 212 may include a nanowire. For example, the electrode 212 may include a metallic nanowire.

The interconnecting structure is provided at the upper portion of the first electrode part 210. The interconnecting structure may exist in an area D having the depth of 1 μm from the upper portion of the first electrode part 210. Preferably, the nanowire may exist at an area D having the depth of 100 nm from the upper portion of the first electrode part 210.

In addition, the concentration of the interconnecting structure becomes stronger toward the surface of the base 211. In this case, the concentration of the interconnecting structure may represent the number of interconnecting structures existing in the same volume. Further, the concentration of the interconnecting structure may gradually become stronger as the interconnecting structure is gradually away from the substrate 100.

The first electrode part 210 may include a photosensitive nanowire film. The first electrode part 210 includes a photosensitive nanowire film, so that the thickness of the first electrode part 210 may be decreased. In other words, the first electrode part 210 includes the nanowire and the whole thickness of the first electrode 210 may be decreased. According to the related art, when the electrode part includes a nanowire, an overcoating layer is additionally formed to prevent the nanowire from being oxidized. Accordingly, the fabricating process is complicated and the thickness of the touch window is increased. However, according to the present embodiment, the interconnecting structure including the nanowire is contained in a photosensitive material, so that the nanowire can be prevented from being oxidized without the overcoating layer.

The thickness of the first electrode part 210 may be in the range of 1 μm to 6 μm. In more detail, the thickness of the first electrode part 210 may be in the range of 2 μm to 5 μm.

When the thickness of the first electrode part 210 is in the range of 1 μm to 6 μm, surface resistance may be in the range of 120 Ω/square to 180 Ω/square. Preferably, when the thickness of the first electrode part 210 is in the range of 2 μm to 5 μm, the surface resistance may be in the range of 140 Ω/square to 160 Ω/square. More preferably, when the thickness of the first electrode part 210 is 5 μm, the surface resistance may be 150 Ω/square.

In addition, when the thickness of the first electrode part 210 is in the range of 1 μm to 6 μm, haze on polycarbonate may be in the range of 0.1% to 0.9%. Preferably, when the thickness of the first electrode part 210 is in the range of 2 μm to 5 μm, the haze on the polycarbonate may be in the range of 0.3% to 0.7%. More preferably, when the thickness of the first electrode part 210 is 5 μm, the haze on the polycarbonate may be 0.5%.

In addition, when the thickness of the first electrode part 210 is in the range of 1 μm to 6 μm, haze on a poly(ethylene terephthalate) (PET) film may be in the range of 0.8% to 1.6%. Preferably, when the thickness of the first electrode part 210 is in the range of 2 μm to 5 μm, the haze on the PET film may be in the range of 1.0% to 1.4%. More particularly, when the thickness of the first electrode part 210 is 5 μm, the haze on the PET film may be 1.2%.

When the thickness of the first electrode part 210 is in the range of 1 μm to 6 μm, transmittance on polycarbonate may be in the range of 87% to 95%. Preferably, when the thickness of the first electrode part 210 is in the range of 2 μm to 5 μm, the transmittance on the polycarbonate may be in the range of 89% to 93%. More preferably, when the thickness of the first electrode part 210 is 5 μm, the transmittance on the polycarbonate may be 91%.

Further, when the thickness of the first electrode part 210 is in the range of 1 μm to 6 μm, transmittance on a poly(ethylene terephthalate) (PET) film may be in the range of 85% to 93%. Preferably, when the thickness of the first electrode part 210 is in the range of 2 μm to 5 μm, transmittance on a poly(ethylene terephthalate) (PET) film may be in the range of 87% to 91%. More preferably, when the thickness of the first electrode part 210 is 5 μm, transmittance on a poly(ethylene terephthalate) (PET) film may be 89%.

Similarly, the second electrode part 220 includes a base 221 and an electrode 222 provided on the base 221. The electrode 222 substantially performs an electrical function at an upper portion of the base 221.

The base 221 and the electrode 222 have the same pattern. In other words, when the second electrode part 220 has a bar-shaped pattern extending in an opposite direction, the base 221 and the electrode 222 have bar-shaped pattern extending in the opposite direction.

The base 221 includes a photosensitive material. The base 221 includes the photosensitive material, so that the second electrode part 220 may be formed through an exposure and development process.

The electrode 222 may include an interconnecting structure. The interconnecting structure may have a fine structure having a diameter in the range of 10 nm to 200 nm. Preferably, the interconnecting structure may be a fine structure having the diameter in the range of 20 nm to 100 nm. In this case, the electrode 222 may include a nanowire. For example, the electrode 222 may include a metallic nanowire.

The interconnecting structure is provided at the upper portion of the second electrode part 220. The interconnecting structure may exist in an area D having the depth of 1 μm from the upper portion of the second electrode part 220. Preferably, the nanowire may exist at an area D having the depth of 100 nm from the upper portion of the second electrode part 220.

In addition, the concentration of the electrode 222 becomes stronger toward the cover window provided at the upper portion of the substrate 100. In other words, the concentration of the interconnecting structure may become stronger toward the surface of the base 211. In this case, the concentration of the interconnecting structure may represent the number of interconnecting structures existing in the same volume. Further, the concentration of the interconnecting structure may gradually become stronger as the interconnecting structure is gradually away from the substrate 100.

The second electrode part 220 may include a photosensitive nanowire film. The second electrode part 220 includes a photosensitive nanowire film, so that the thickness of the second electrode part 220 may be decreased. In other words, the second electrode part 220 includes the nanowire and the whole thickness of the first electrode 210 may be decreased. According to the related art, when the electrode part 220 includes a nanowire, an overcoating layer is additionally formed to prevent the nanowire from being oxidized. Accordingly, the fabricating process is complicated and the thickness of the touch window is increased. However, according to the present embodiment, the interconnecting structure including the nanowire is contained in a photosensitive material, so that the nanowire can be prevented from being oxidized without the overcoating layer.

The thickness of the second electrode part 220 may be in the range of 1 μm to 6 μm. In more detail, the thickness of the second electrode part 220 may be in the range of 2 μm to 5 μm. An intermediate layer 400 may be additionally interposed between the first and second electrode parts 210 and 220. The intermediate layer 400 may insulate the first electrode part 210 from the second electrode part 220. The intermediate layer 400 may bond the first electrode part 210 to the second electrode part 220. In addition, the intermediate layer 400 may be flattened, so that the second electrode part 220 may be stably formed on the first electrode part 210.

The intermediate layer 400 may include an optical clear adhesive (OCA). In addition, the intermediate layer 400 may include a photosensitive film.

In addition, the intermediate layer 400 may include a dielectric material. The intermediate layer 400 includes the dielectric material, so that the thickness of the touch window can be reduced as compared with that of a touch window according to the related art having a structure in which the first electrode part 210 is formed on one substrate, the second electrode part 220 is formed on an opposite substrate, and the one substrate is bonded to the opposite substrate through an adhesive layer. In other words, one of the one substrate and the opposite substrate and the adhesive layer may be omitted. In this case, the thickness of the intermediate layer 400 may be thinner than that of the substrate 100. In detail, the thickness of the intermediate layer 400 may be 0.05 to 0.5 times thicker than that of the substrate 100. For example, the thickness of the substrate 100 is 0.05 mm, and the thickness of the intermediate layer 400 may be 0.005 mm.

The thickness of the touch window may be reduced due to the intermediate layer 400, so that the transmittance of the touch window can be improved, and the first and second electrode parts 210 and 220 can be prevented from being cracked. Therefore, the bending property and the reliability of the touch window can be improved.

Thicknesses of the first and second electrode parts 210 and 220 are reduced, so that the whole thickness of the touch panel can be reduced. In addition, the bases 211 and 221 of the first and second electrode parts 210 and 220 can prevent the nanowires from being oxidized to protect the nanowires. Accordingly, an additional layer to protect the nanowires may be omitted.

The whole thickness of the substrate 100 and the electrode part 200 may be in the range of 60 μm to 140 μm. In other words, the whole thickness of the substrate 100, the first electrode part 210, the intermediate layer 400, and the second electrode part may be in the range of 60 μm to 140

μm. Preferably, the whole thickness of the first substrate 100, the first electrode part 210, the intermediate layer 400, and the second electrode part 220 may be in the range of 80 μm to 120 μm. More preferably, the whole thickness of the first substrate 100, the first electrode part 210, the intermediate layer 400, and the second electrode part 220 may be in the range of 90 μm to 110 μm.

The wire 300 may be formed in the unactive area UA for the electrical connection of the electrode part 200. The wire 300 includes a first wire 310 for the connection of the first electrode part 210 and a second wire 320 for the connection of the second electrode part 220.

The wire 300 may include metal representing superior electrical conductivity. For example, the wire 300 may include Cr, Ni, Cu, Al, Ag and Mo, and the alloy thereof. Specifically, the wire 300 may include various metallic pastes allowing the wire 300 to be formed through a printing process.

However, the embodiment is not limited to above, and the wire 300 may include metallic oxide such as indium tin oxide, indium zinc oxide, copper oxide, tin oxide, zinc oxide, or titanium oxide. In addition, the wire 300 may include a nanowire, a photosensitive nanowire film, a carbon nano-tube (CNT), graphene, or conductive polymer.

Meanwhile, the wire 300 may include a conductive pattern. That is, the wire 300 may be provided in a mesh pattern. Thus, the wire 300 may be hidden so that the unactive area UA may be transparent. Therefore, the touch window may be applied to a transparent touch device.

An electrode pad is positioned at an end of the wire 300. The electrode pad may be connected to a printed circuit board. In detail, although not shown in drawings, a connection terminal may be positioned at one surface of the printed circuit board, and the electrode pad may be connected with the connection terminal. The electrode pad may have the size corresponding to the connection terminal.

Various types of printed circuit boards may be applicable. For example, a flexible printed circuit board (FPCB) is applicable as the printed circuit board.

Figure 4:
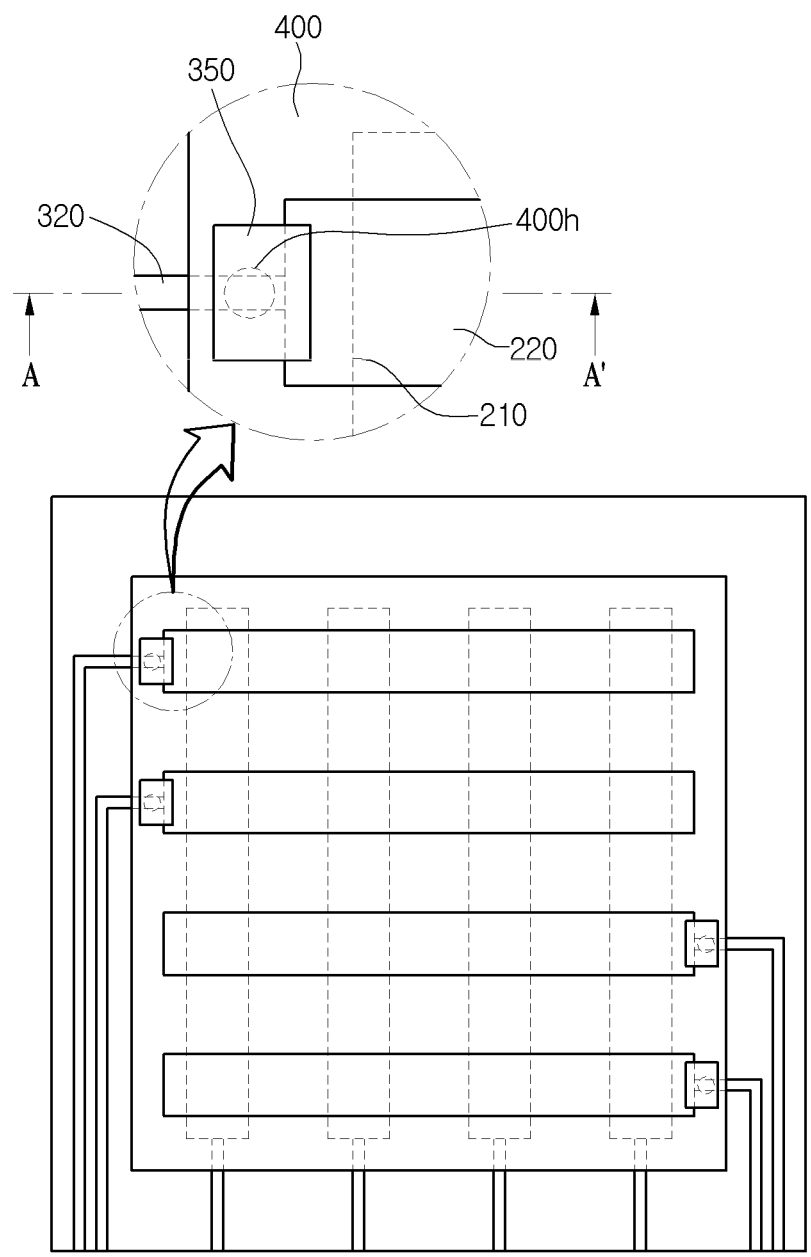
FIG. 4 is a plan view schematically showing a touch window according to another embodiment.
Figure 5:
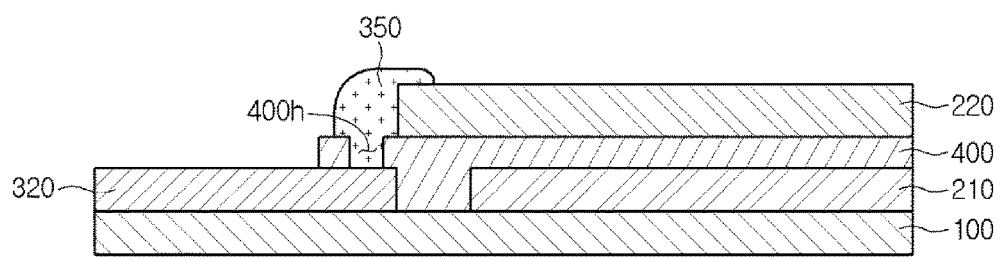
FIG. 5 is a sectional view taken along line A-A' of FIG. 4.

Meanwhile, referring to FIGS. 4 and 5, in a touch window according to another embodiment, the second electrode part 220 may be connected with the second wire 320 through a wire connecting part 350. In detail, the intermediate layer 400 may include a hole 400h, and the wire connecting part 350 may be connected with the second wire 320 through the hole 400h.

In this case, the second wire 320 may be provided on the top surface of the substrate 100 together with the first wire 310 and the first electrode part 210. Accordingly, the second wire 320 may be connected with the second electrode part 220 provided on a different plane through the wire connecting part 350.

Accordingly, the size of a bezel can be reduced, and a wide active area AA can be ensured.

Hereinafter, a method of fabricating the touch window according to one embodiment will be described with reference to FIGS. 6 and 7.

Figure 6:
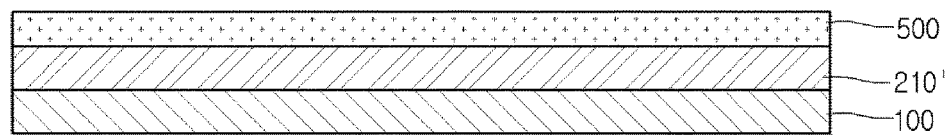
FIGS. 6 and 7 are sectional views showing a method of fabricating the touch window according to one embodiment.

First, referring to FIG. 6, an electrode material 210' may be formed on the substrate 100. The electrode material 210' may include a photosensitive nanowire film. The electrode material 210' may be formed through a lamination process. Thereafter, a protective layer 500 may be formed on the electrode material 210'.

Figure 7:
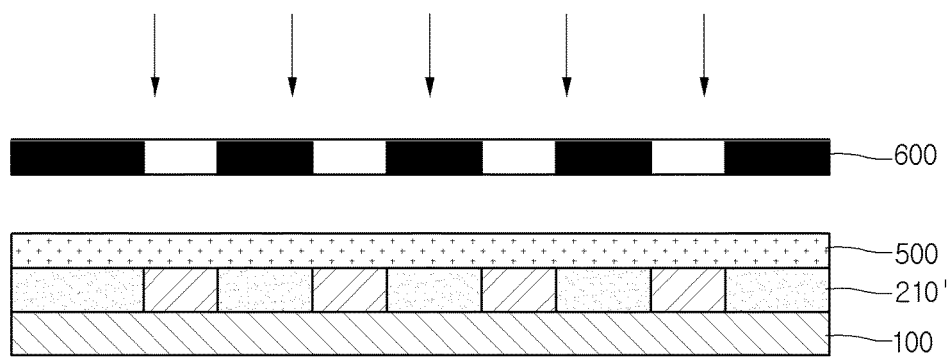

Thereafter, referring to FIG. 7, a mask 600 having a pattern to be formed is positioned on the substrate 100. An exposure process of irradiating an ultraviolet light onto the mask 600 may be performed to form the pattern.

Thereafter, the protective layer 500 is removed and the electrode material 210' is developed, thereby forming the electrode part 210 having the pattern. The second electrode part 220 may be formed through the same process.

Hereinafter, touch windows according to other embodiments will be described with reference to FIGS. 8 to 10.

Figure 8:
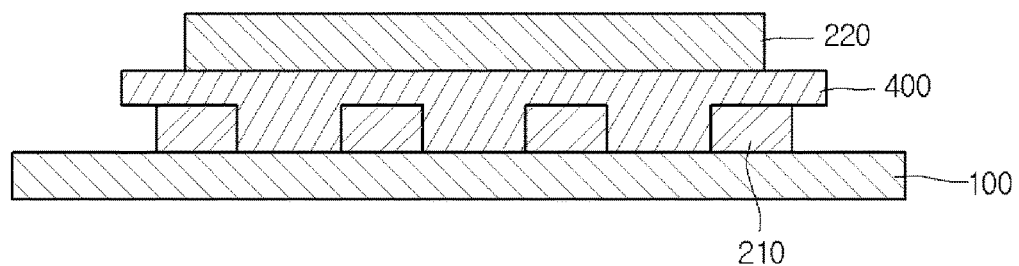
FIGS. 8 to 10 are sectional views showing a touch window according to another embodiment.

First, referring to FIG. 8, the intermediate layer 400, which is interposed between the first and second electrode parts 210 and 220, may be provided in a space of the first electrode part 210. In other words, a space is not formed between the intermediate layer 400 and the first electrode part 210.

Figure 9:
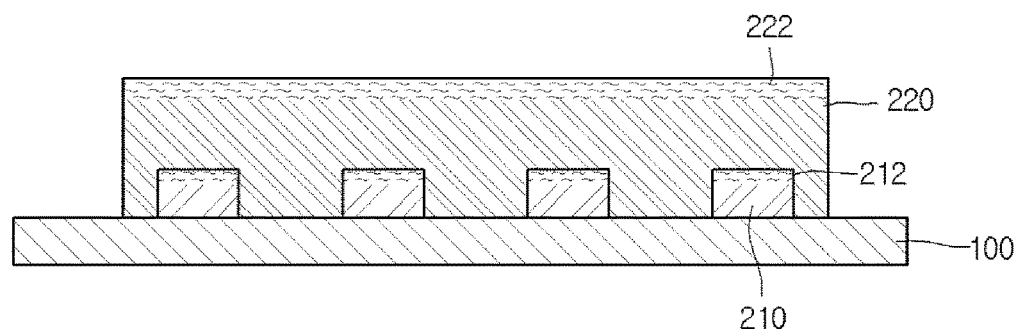

Thereafter, referring to FIG. 9, the electrode 212 of the first electrode part 210 is provided only on the upper portion of the first electrode part 210, the electrode 222 of the second electrode part 220 is provided only on the upper portion of the second electrode part 220, and the intermediate layer 400 shown in FIG. 8 is omitted. In other words, the electrodes 212 and 222 are provided only the upper portions of the first and second electrode parts 210 and 220, respectively, so that the electrodes 212 and 222 can be insulated from each other without an additional insulating layer. Accordingly, the intermediate layer 400 may be omitted.

Figure 10:
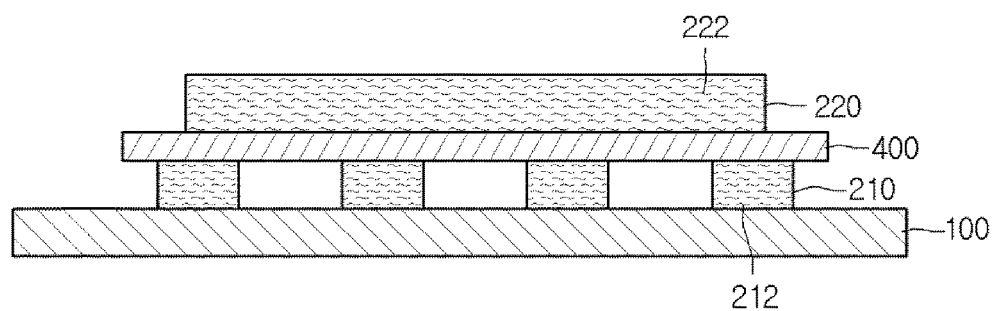

Thereafter, referring to FIG. 10, the electrode 212 of the first electrode part 210 is provided in the entire portion of the first electrode part 210, and the electrode 222 of the second electrode part 220 is provided in the entire portion of the second electrode part 220. In this case, the intermediate layer 400 may be provided between the first and second electrode parts 210 and 220 so that the first and second electrodes 210 and 220 are insulated from each other.

Hereinafter, a touch window according to another embodiment will be described with reference to FIGS. 11 to 17. For the clear and brief explanation, the structure and the components the same as or similar to those of the first embodiment will not be further described.

Figure 11:
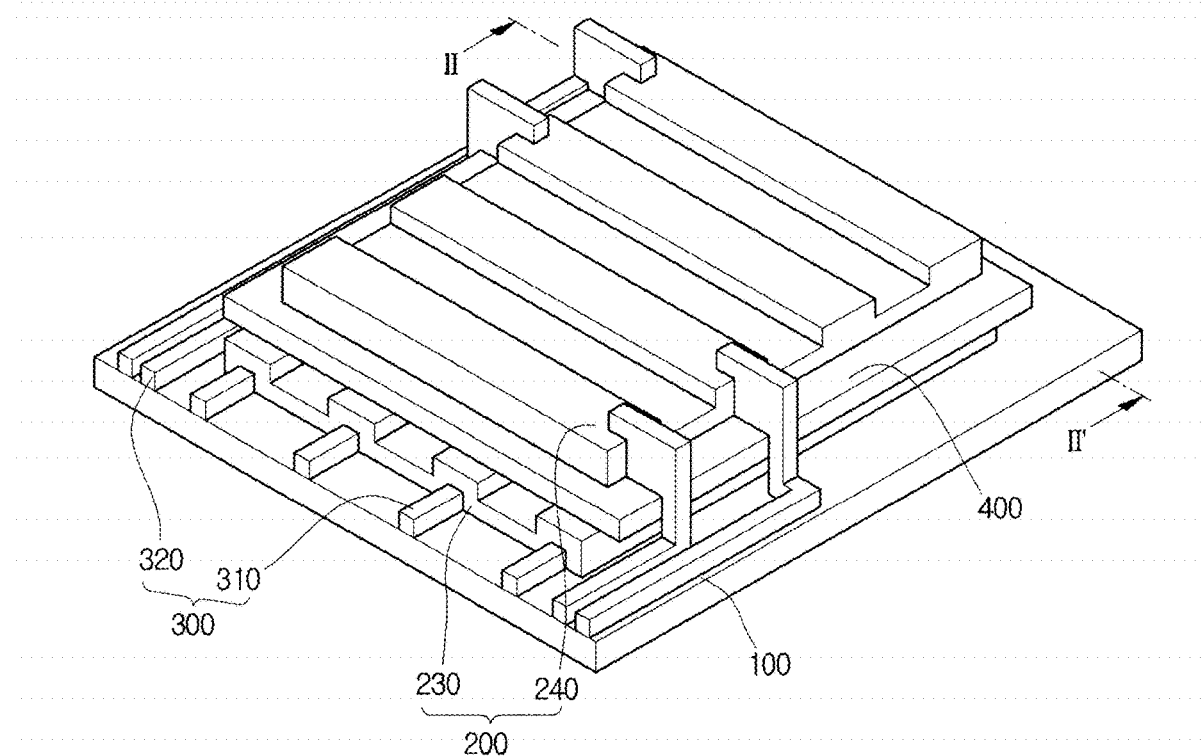
FIG. 11 is a perspective view showing a touch window according to another embodiment.
Figure 12:
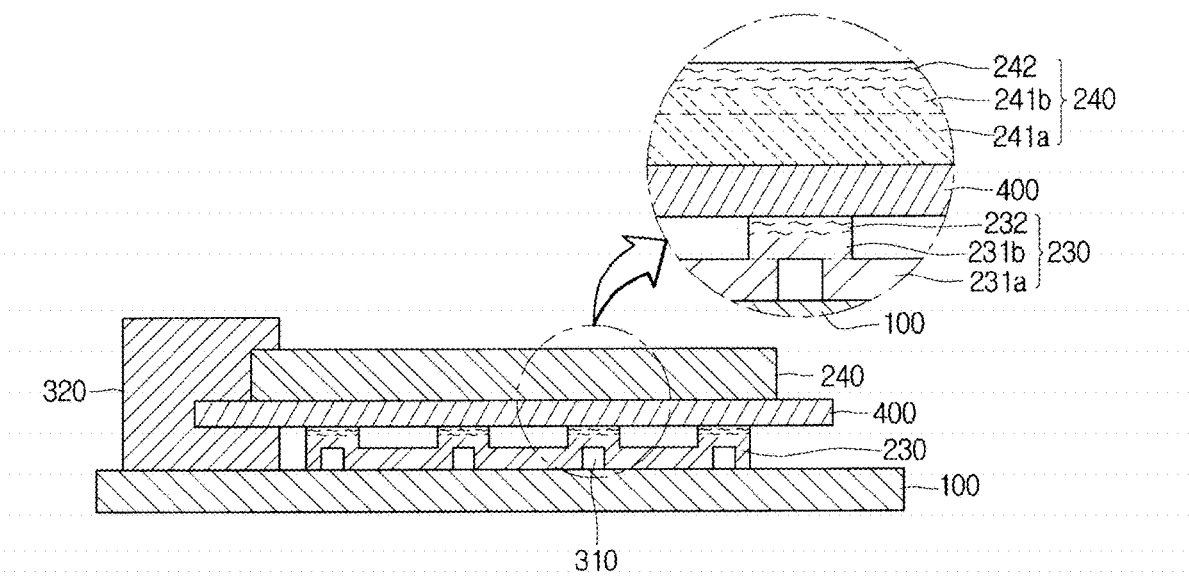
FIG. 12 is a sectional view taken along line II-II' of FIG. 11.

Referring to FIGS. 11 and 12, a first electrode part 230 includes a first base 231a, a second base 231b, and an electrode 232.

The first base 231a is provided at the lowest portion of the first electrode part 230. The first base 231a includes a photosensitive material.

The second base 231b is provided on the first base 231a. The second base 231b includes a photosensitive material. The second base 231b has a bar-shaped pattern extending in one direction.

The electrode 232 is provided on the second base 231b. The electrode 232 has a bar-shaped pattern extending in one direction. In other words, the second base 231b and the electrode 232 have the same pattern.

The visibility of the electrode 232 can be improved due to the first base 231a. In other words, the difference in height between the electrode 232 and an area in which the electrode 232 is not formed can be reduced due to the first base 231a, so that the visibility of the electrode 232 can be improved. In addition, when the first electrode part 230 is bonded to a second electrode part 240, bubbles resulting from a step difference can be reduced, so that the reliability of the touch window can be improved.

In addition, when a wire connected with the first electrode part 230 is withdrawn, the step difference resulting from the height of the first electrode part 230 can be improved, thereby preventing the wire from being shorted or cracked.

Similarly, the second electrode part 240 includes a third base 241a, a fourth base 241b, and an electrode 242.

The third base 241*a* is provided at the lowest portion of the second electrode part 240. The third base 241*a* includes a photosensitive material.

The fourth base 241*b* is provided on the third base 241*a*. The third base 241*b* includes a photosensitive material. The fourth base 241*b* has a bar-shaped pattern extending in an opposite direction.

The electrode 242 is provided on the fourth base 241*b*. The electrode 242 has a bar-shaped pattern extending in an opposite direction. In other words, the fourth base 241*b* and the electrode 242 have the same pattern.

Hereinafter, a method of fabricating a touch window according to another embodiment will be described with reference to FIGS. 13 to 17.

Figure 13:
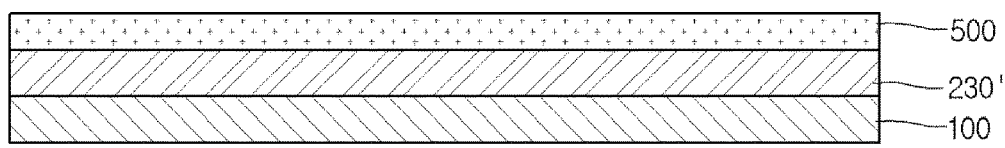
FIGS. 13 to 17 are sectional views showing a method of fabricating the touch window according to another embodiment.

First, referring to FIG. 13, the electrode material 230' and the protective layer 500 are formed on the substrate 100.

Figure 14:
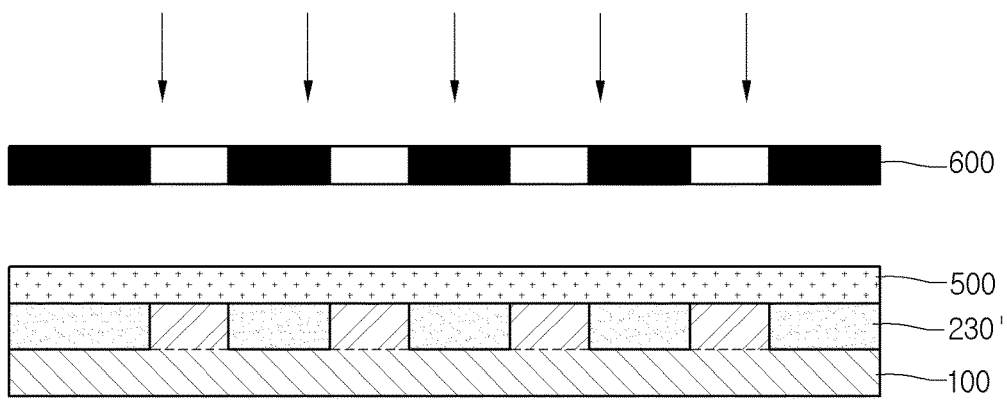

Subsequently, referring to FIG. 14, a mask 600 having a pattern to be formed may be positioned on the substrate 100. The pattern may be formed through a first exposure process to irradiate an ultraviolet light onto the mask 600. Since the first exposure process is performed in the state that the protective layer 500 is provided, the electrode material 230' is blocked from oxygen. Accordingly, the electrode material 230' is hardened. In this case, light exposure in the first exposure process may be in the range of 10 mJ to 50 mJ.

Figure 15:
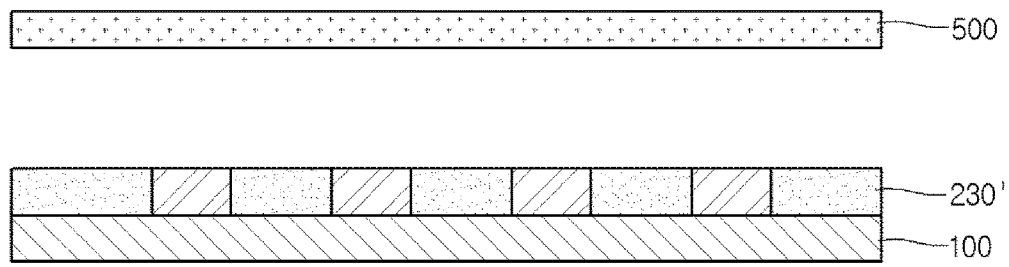

Thereafter, referring to FIG. 15, the protective layer 500 may be removed.

Figure 16:

Referring to FIG. 16, a second exposure process may be performed to irradiate an ultraviolet light onto the electrode material 230' without the protective layer 500. A flood exposure process is performed in the second exposure process. Since the second exposure process is performed without the protective layer 500 on the electrode material 230', the electrode material 230' reacts with oxygen. Accordingly, the electrode material 230' is not hardened, so that the development area of the electrode material 230' can be reduced. In other words, through the second exposure process, the step difference between the electrode 232 provided on the upper portion of the electrode part 230 and the top surface in which the electrode 232 is not formed can be reduced. In this case, light exposure may be in the range of 50 mJ to 500 mJ in the second exposure process. Light exposure energy in the second exposure process is greater than light exposure energy in the first exposure process.

Figure 17:
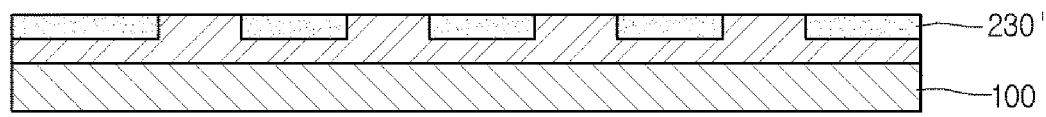

Referring to FIG. 17, the electrode material 230' may be developed, thereby forming the electrode part 230 having the pattern. The second electrode part 240 may be formed through the process.

Hereinafter, a touch window according to another embodiment will be described with reference to FIGS. 18 to 24.

Figure 18:
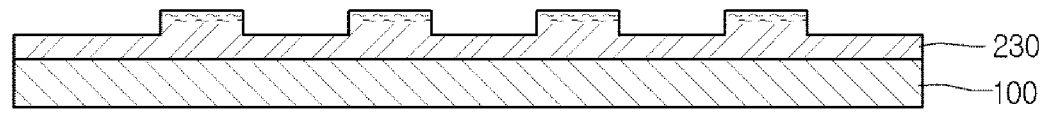
FIGS. 18 to 24 are sectional views showing a touch window according to another embodiment.

First, referring to FIG. 18, the intermediate layer 400, which is interposed between the first electrode part 230 and the second electrode part 240, may be provided in a space of the first electrode part 230. In other words, a space is not formed between the intermediate layer 400 and the first electrode part 230.

Figure 19:
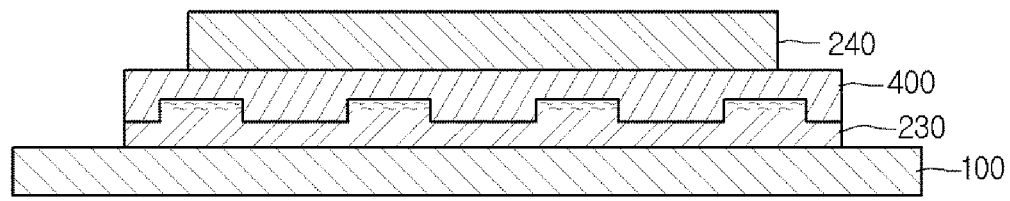

Thereafter, referring to FIG. 19, the electrode 232 of the first electrode part 230 is provided only on the upper portion of the first electrode part 230, the electrode 242 of the second electrode part 240 is provided only on the upper portion of the second electrode part 240, and the intermediate layer 400 shown in FIG. 18 is omitted. In other words, the electrodes 232 and 242 are provided only the upper portions of the first and second electrode parts 230 and 240, respectively, so that the electrodes 232 and 242 can be insulated from each other without an intermediate layer. Accordingly, the intermediate layer 400 may be omitted.

Figure 20:
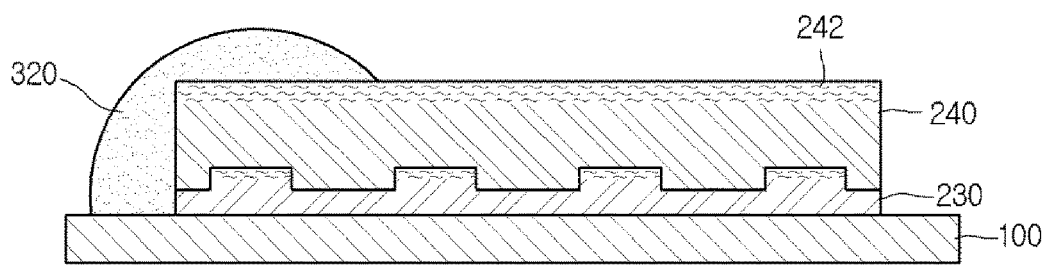

Therefore, the thickness of the touch window can be reduced. As shown in FIG. 20, the second wire 320 for the connection of the second electrode part 240 may be formed without the step difference.

Figure 21:
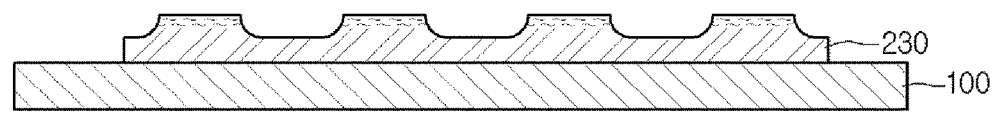
Figure 22:
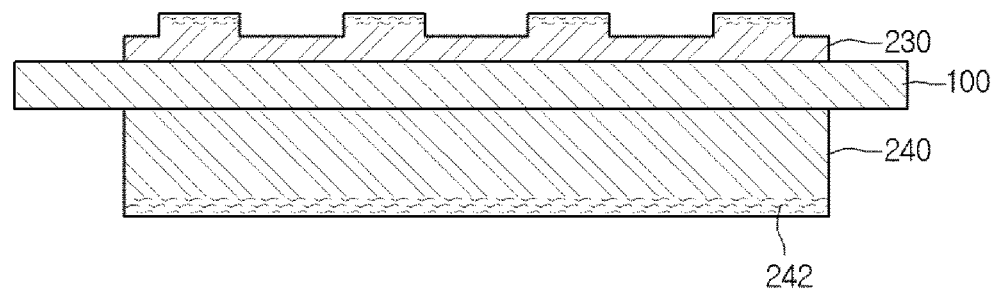

Thereafter, as shown in FIG. 21, the first electrode part 230 may have a rounded shape. In other words, the first electrode part 230 may have a rounded structure.

Thereafter, the first and second electrode parts 230 and 240 may be provided on both sides of the substrate 100, respectively. In other words, the first and second electrode parts 230 and 240 may be provided mutually different planes.

Figure 23:
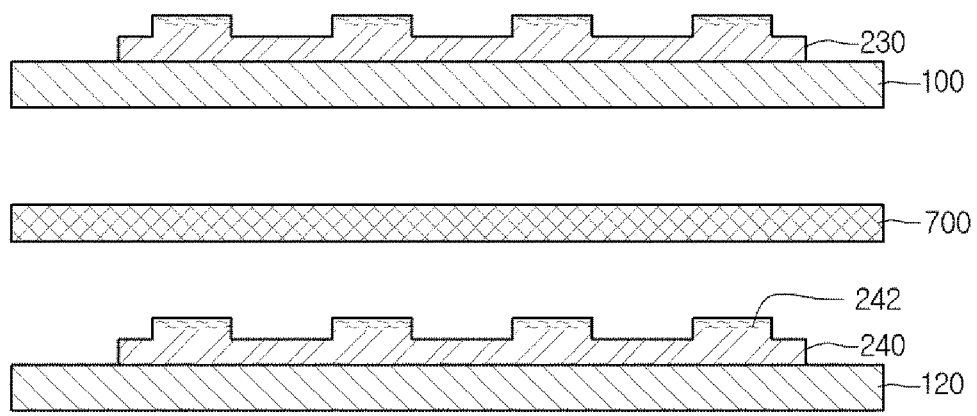

Next, as shown in FIG. 23, the first and second electrode parts 230 and 240 are provided on mutually different substrates 100 and 120, respectively, and a bonding layer 700 to bond the substrates 100 and 120 to each other may be further provided. In other words, the first and second electrode parts 230 and 240 may be provided mutually different planes.

Figure 24:
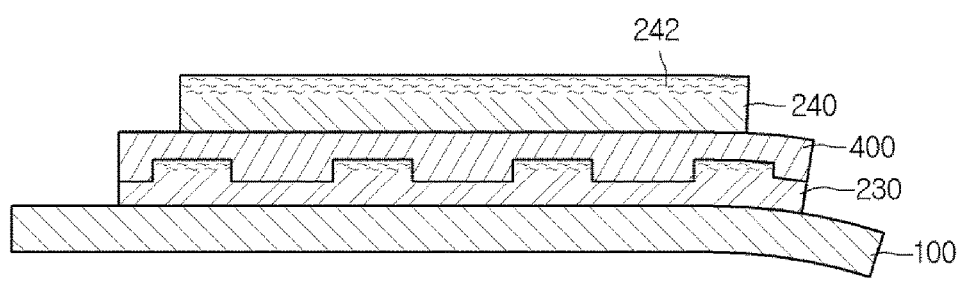

Thereafter, as shown in FIG. 24, the touch window may include a bendable area. The first and second electrode parts 230 and 240 include the electrodes 232 and 242, respectively, and the electrodes 232 and 242 include nanowires. The nanowires have a flexible property allowing the substrate to be curved or bent. Accordingly, the touch window, which is bendable, can be realized due to the electrodes 232 and 242.

Figure 25:
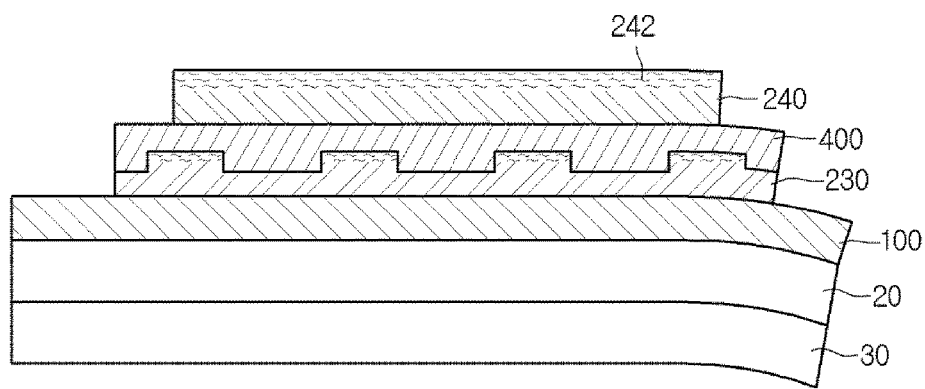
FIG. 25 is a sectional view showing a touch device assembled with the touch window according to the embodiment.

Next, as shown in FIG. 25, the touch window may be bonded to a driving part 20 and a light source part 30 to constitute the touch device. In particular, the touch window has a bendable structure as shown in FIG. 25, and the touch device including the touch window may include a flexible touch device.

In particular, the driving part 20 may include a display panel. The driving part 20 may include various driving parts depending on a type of the touch device according to the embodiment. In other words, the touch device according to the embodiment may include a liquid crystal display (LCD), a field emission display, a plasma display panel (PDP), an organic light emitting display (OLED), and an electrophoretic display (EPD). Accordingly, the display panel may include various types of display panels.

In addition, the touch window is applicable to not only a mobile terminal, but a vehicle, so that the touch window is applicable to a personal navigation display (PND) for a vehicle navigation system. Further, the touch window is applicable to a dashboard so that a center information display (CID) can be realized, but the embodiment is not limited thereto. The touch device can be used for various electronic products.

Figure 26:
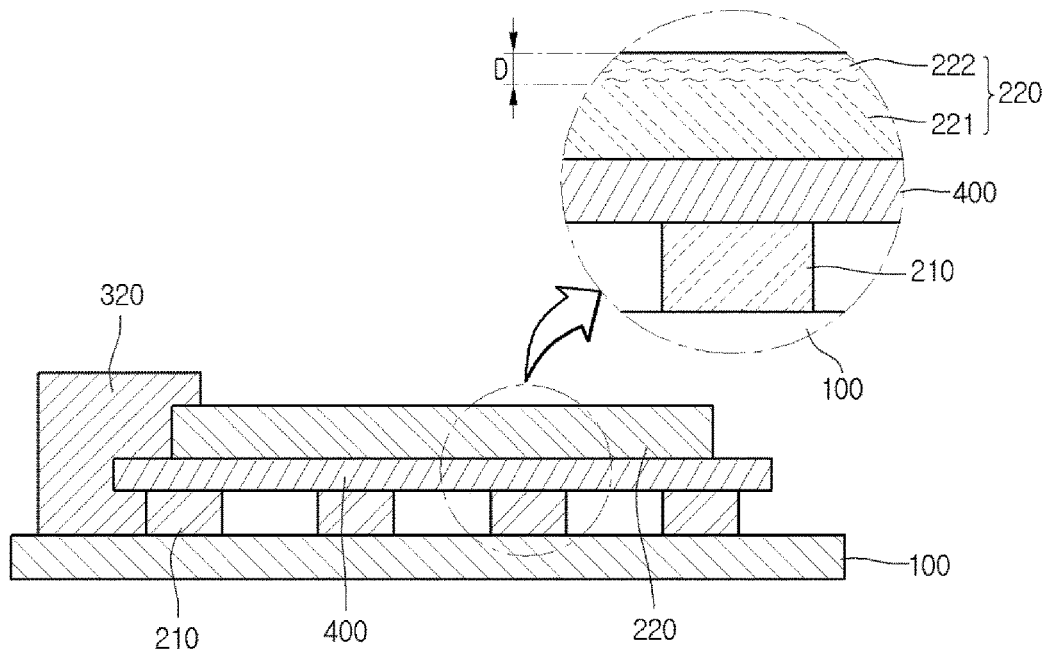
FIGS. 26 to 33 are sectional views showing the touch window according to another embodiment.

Meanwhile, referring to FIG. 26, the first and second electrode parts 210 and 220 may include mutually different materials. The first electrode part 210 includes a first material, and the second electrode part 220 may include a second material different from the first material. The first and second electrode parts 210 and 220 may be patterned through mutually different schemes. In other words, a scheme of patterning the first electrode part 210 may be different from a scheme of patterning the second electrode part 220. Therefore, in the selective patterning, each patterning process may not exert an influence on another patterning process. Therefore, the more precise patterning process is possible, and the touch window having various structures can be ensured.

The first electrode part 210 may have a bar-shaped pattern extending in one direction.

The first electrode part 210 may include a transparent conductive material allowing current to flow without interrupting the transmission of light. The first electrode part 210 may include a first material. The first material may include metallic oxides such as indium tin oxide, indium zinc oxide, copper oxide, tin oxide, zinc oxide, and titanium oxide. In addition, the first electrode part 210 may include a second material different from the first material. The second material may include various metals such as a nanowire, a photosensitive nanowire film, a carbon nano-tube (CNT), graphene, and conductive polymer. For example, the first electrode part 210 may include metal such as Cr, Ni, Cu, Al, Ag, Mo, and the alloy thereof. The materials have a flexible property allowing the substrate to be curved or bent. When the first electrode part 210 may include a metallic material, the first electrode part 210 is provided in the shape of a mesh. The materials may be coated on the substrate 100 through a spin coating scheme, a spray coating scheme, and a dip coating scheme, but the embodiment is not limited thereto. In other words, the first and second materials may include materials patterned through different patterning schemes.

Subsequently, the second electrode part 220 may have a bar-shaped pattern extending in an opposite direction.

The second electrode part 220 includes the base 221 and the electrode 222 provided on the base 221. The electrode 222 may be provided at the upper portion of the base 221. The electrode 222 substantially performs an electrical function at the upper portion of the base 221.

The base 221 and the electrode 222 may have the same pattern. In other words, when the second electrode part 220 has a bar-shaped pattern extending in an opposite direction, the base 221 and the electrode 222 have bar-shaped pattern extending in the opposite direction.

The base 221 includes a photosensitive material. The base 221 includes the photosensitive material, so that the second electrode part 220 may be formed through an exposure and development process, which will be described later.

The electrode 222 may include an interconnecting structure. The interconnecting structure may have a fine structure having a diameter in the range of 10 nm to 200 nm. For example, the electrode 222 may include a metallic nanowire.

The interconnecting structure is provided at the upper portion of the second electrode part 220. The interconnecting structure may exist in an area D having the depth of 1 μm from the upper portion of the second electrode part 220. Preferably, the interconnecting structure may exist at an area D having the depth of 100 nm from the upper portion of the second electrode part 220.

In addition, the concentration of the electrode 222 becomes stronger toward the cover window provided at the upper portion of the substrate 100. In other words, the concentration of the interconnecting structure may become stronger toward the surface of the base 211. In this case, the concentration of the interconnecting structure may represent the number of interconnecting structures existing in the same volume. Further, the concentration of the interconnecting structure may gradually become stronger as the interconnecting structure is gradually away from the substrate 100.

The second electrode part 220 may include a photosensitive nanowire film. The second electrode part 220 includes a photosensitive nanowire film, so that the thickness of the second electrode part 220 may be reduced. According to the related art, when the electrode part 220 includes a nanowire, an overcoating layer is additionally formed to prevent the nanowire from being oxidized. Accordingly, the fabricating process is complicated and the thickness of the touch window is increased. However, according to the present embodiment, the interconnecting structure including the nanowire is contained in a photosensitive material, so that the nanowire can be prevented from being oxidized without the overcoating layer.

The thickness of the second electrode part 220 may be in the range of 1 μm to 6 μm. In more detail, the thickness of the second electrode part 220 may be in the range of 2 μm to 5 μm.

The intermediate layer 400 may be additionally interposed between the first and second electrode parts 210 and 220. The intermediate layer 400 may insulate the first electrode part 210 from the second electrode part 220. The intermediate layer 400 may bond the first electrode part 210 to the second electrode part 220. In addition, the intermediate layer 400 may be flattened, so that the second electrode part 220 may be stably formed on the first electrode part 210.

The intermediate layer 400 may include an optical clear adhesive (OCA). In addition, the intermediate layer 400 may include a photosensitive film.

In addition, the intermediate layer 400 may include a dielectric material. In this case, the thickness of the intermediate layer 400 may be thinner than that of the substrate 100. In detail, the thickness of the intermediate layer 400 may be 0.05 to 0.5 times thicker than that of the substrate 100. For example, the thickness of the substrate 100 is 0.05 mm, and the thickness of the intermediate layer 400 may be 0.005 mm.

The thickness of the touch window may be reduced due to the intermediate layer 400, so that the transmittance of the touch window can be improved, and the first and second electrode parts 210 and 220 can be prevented from being cracked. Therefore, the bending property and the reliability of the touch window can be improved.

According to the embodiment, the second electrode part 220 may be patterned through an exposure and development process, and the first electrode part 210 may be patterned through a scheme different from the exposure and development process, so that the patterning processes can be independently performed. In other words, the patterning process for the first electrode part 210 does not exert an influence on the patterning process for the second electrode part 220, so that the selective patterning process is possible.

In addition, the second electrode part 220 is formed with a thin thickness, so that the whole thickness of the touch window can be reduced. In addition, the base 221 of the second electrode part 220 may prevent the nanowire from being oxidized and may protect the nanowires. Accordingly, an additional layer to protect the nanowires may be omitted.

Meanwhile, the wire 300 may be formed in the unactive area UA for the electrical connection of the electrode part 200. The wire 300 includes the first wire 310 for the connection of the first electrode part 210 and the second wire 320 for the connection of the second electrode part 220.

The wire 300 may include metal representing superior electrical conductivity. For example, the wire 300 may include Cr, Ni, Cu, Al, Ag and Mo, and the alloy thereof. Specifically, the wire 300 may include various metallic pastes allowing the wire 300 to be formed through a printing process.

The electrode pad is positioned at the end of the wire 300. The electrode pad may be connected to a printed circuit board. In detail, although not shown in drawings, the connection terminal may be positioned at one surface of the printed circuit board, and the electrode pad may be connected with the connection terminal. The electrode pad may have the size corresponding to the connection terminal.

Various types of printed circuit boards may be applicable. For example, a flexible printed circuit board (FPCB) is applicable as the printed circuit board.

Hereinafter, a touch window according to another embodiment will be described with reference to FIGS. 27 to 39. For the clear and brief explanation, the structure and the components the same as or similar to those of the first embodiment will not be further described.

Figure 27:
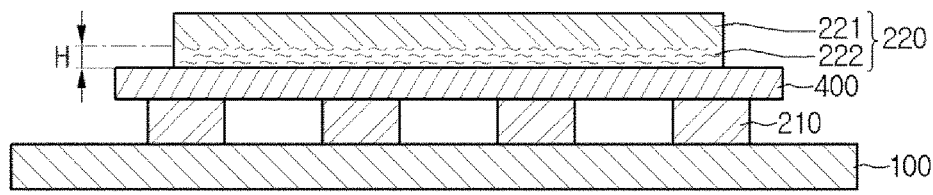

First, referring to FIG. 27, the second electrode part 220 includes the base 221 and the electrode 222. The electrode 222 may be provided at a lower portion of the base 221. The electrode 222 substantially performs an electrical function at the lower portion of the base 221.

The electrode 222 may include an interconnecting structure. The interconnecting structure may have a fine structure having a diameter in the range of 10 nm to 200 nm. Preferably, the interconnecting structure may be a fine structure having the diameter in the range of 20 nm to 100 nm. In this case, the electrode 222 may include a nanowire. For example, the electrode 222 may include a metallic nanowire. The second electrode part 220 may include a photosensitive nanowire film.

The interconnecting structure is provided at the lower portion of the second electrode part 220. The interconnecting structure may exist in an area H having the depth of 1 gm from the lower portion of the second electrode part 220. Preferably, the nanowire may exist at an area DI I having the depth of 100 nm from the lower portion of the second electrode part 220.

In addition, the concentration of the interconnecting structure may become stronger toward the bottom surface of the base 211. In this case, the concentration of the interconnecting structure may represent the number of interconnecting structures existing in the same volume.

Figure 28:
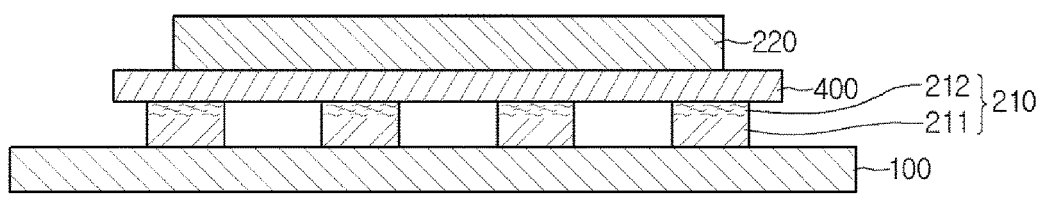

Meanwhile, referring to FIG. 28, the first electrode part 210 includes the base 211 and the electrode 212 provided on the base 211. The electrode 212 may be provided at the upper portion of the base 211.

The electrode 212 may include an interconnecting structure. The interconnecting structure may have a fine structure having a diameter in the range of 10 nm to 200 nm. Preferably, the interconnecting structure may be a fine structure having the diameter in the range of 20 nm to 100 nm. In this case, the electrode 212 may include a nanowire. For example, the electrode 212 may include a metallic nanowire. The first electrode part 210 may include a photosensitive nano wire film.

In this case, the second electrode part 220 includes a material different from a material constituting the first electrode part 210. In other words, the second electrode part 220 may include a material allowing the second electrode part 220 to be patterned through a scheme different from a patterning scheme for the first electrode part 210.

The second electrode part 220 may include a transparent conductive material allowing current to flow without interrupting the transmission of light. The second electrode part 220 may include a first material. The first material may include metallic oxides such as indium tin oxide, indium zinc oxide, copper oxide, tin oxide, zinc oxide, and titanium oxide. In addition, the second electrode part 220 may include a second material different from the first material. The second material may include various metals such as a nanowire, a photosensitive nanowire film, a carbon nanotube (CNT), graphene, and conductive polymer. For example, the first electrode part 210 may include metal such as Cr, Ni, Cu, Al, Ag, Mo, and the alloy thereof. The materials have a flexible property allowing the substrate to be curved or bent. When the first electrode part 210 may include a metallic material, the first electrode part 210 is provided in the shape of a mesh. However, the embodiment is not limited thereto, and the materials may be patterned through a scheme different from the patterning scheme for the first and second materials.

Figure 29:
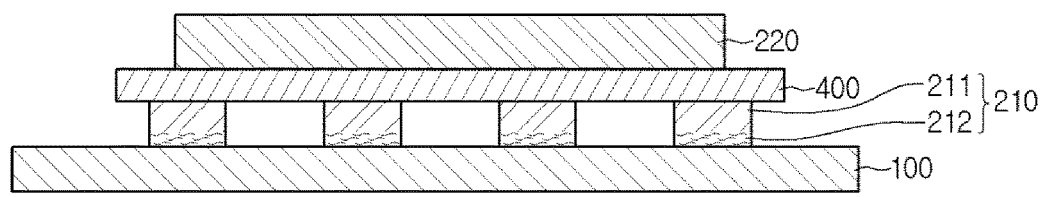

Thereafter, referring to FIG. 29, the first electrode part 210 includes the base 211 and the electrode 212 provided in the base 221. The electrode 212 may be provided at the lower portion of the base 211.

Figure 30:
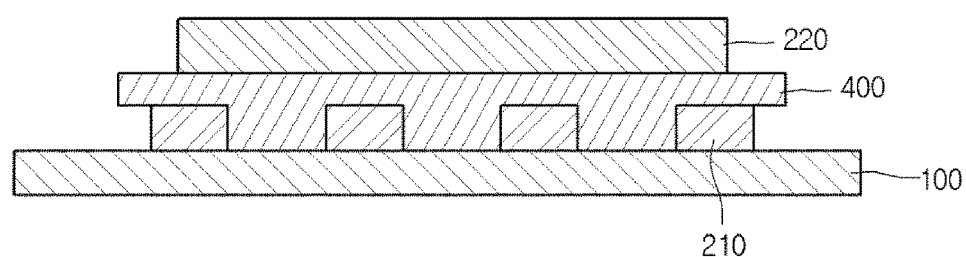

First, referring to FIG. 30, the intermediate layer 400, which is interposed between the first and second electrode parts 210 and 220, may be provided in a space of the first electrode part 210. In other words, a space is not formed between the intermediate layer 400 and the first electrode part 210.

Figure 31:
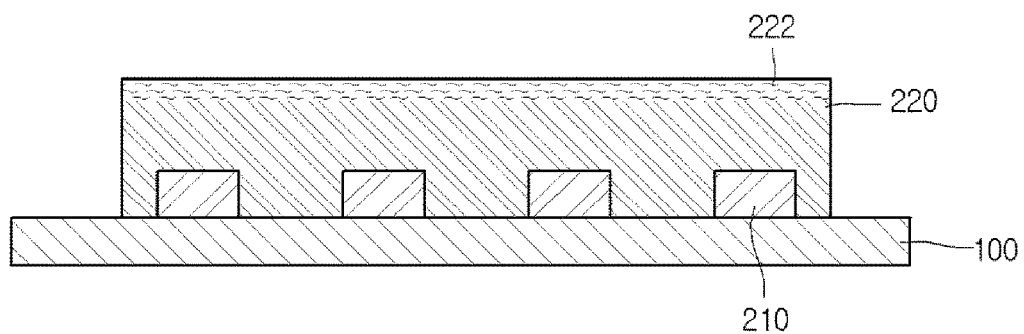

Thereafter, referring to FIG. 31, the electrode 222 of the second electrode part 220 is provided only on the upper portion of the second electrode part 220, and the intermediate layer 400 shown in FIG. 30 is omitted. In other words, the electrode 222 is provided only on an upper portion of the second electrode part 220, so that an insulating property can be performed without an additional intermediate layer. Accordingly, the intermediate layer 400 may be omitted.

Figure 32:
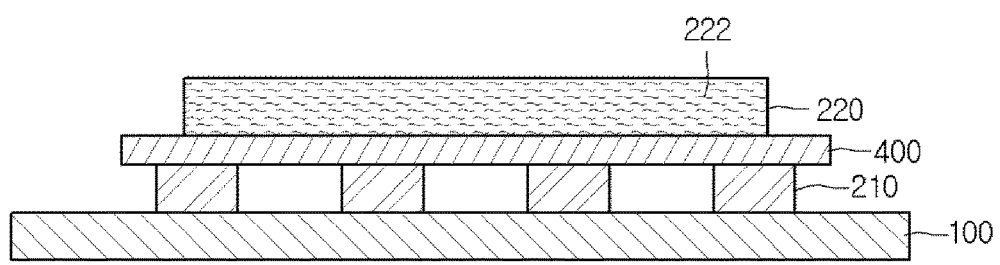

Thereafter, referring to FIG. 32, the electrode 222 of the second electrode part 220 is provided in the entire portion of the second electrode part 220. In this case, the intermediate layer 400 may be provided between the first and second electrode parts 210 and 220 so that the first and second electrodes 210 and 220 may be insulated from each other.

Figure 33:
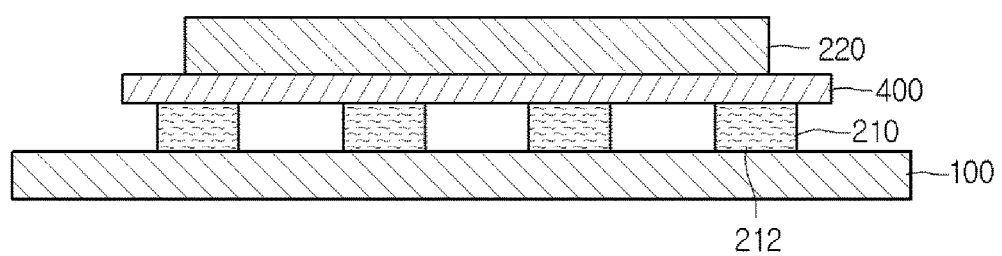

Referring to FIG. 33, the electrode 212 of the first electrode part 210 is provided in the entire portion of the first electrode part 210. In this case, the intermediate layer 400 may be provided between the first and second electrode parts 210 and 220 so that the first and second electrodes 210 and 220 may be insulated from each other.

Figure 34:
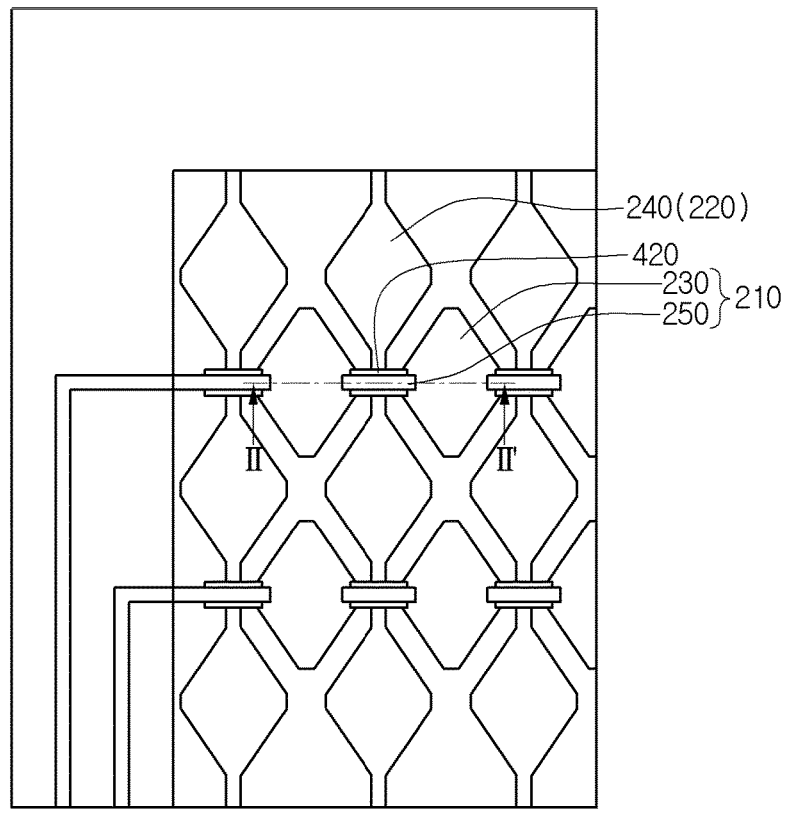
FIG. 34 is an enlarged view showing a part A of FIG. 1 in the touch window according to another embodiment.

Hereinafter, a touch window according to another embodiment will be described with reference to FIGS. 34 and 35.

The first electrode part 210 includes a first sensor part 230 and a first sensor connecting part 250 for the connection of the first sensor part 230. The second electrode part 220 includes a second sensor part 240.

The first sensor part 230 and the second sensor part 240 are provided on the substrate 100. The first and second sensor parts 230 and 240 may directly make contact with the substrate 100. The first and second sensor parts 230 and 240 may be provided on the same plane.

The first sensor connecting part 250 is electrically connected with the first sensor part 230. In this case, an insulating part 420 is provided between the first sensor connecting part 250 and the second sensor part 240. The electrical short between the first connecting part 250 and the second sensor part 240 can be prevented by the insulating part 420. The insulating part 420 may include a transparent insulating material to insulate the first sensor connecting part 250 from the second sensor part 240. For example, the insulating part 420 may include a metallic oxide such as a silicon oxide, or acrylic resin.

In this case, at least one of the first sensor part 230, the first sensor connecting part 250, and the second sensor part 240 may include a material different from a material constituting the others. For example, the material constituting the sensor connecting part 250 is different from materials constituting the first and second sensor parts 230 and 240. Therefore, when the first and second sensor parts 230 and 240 include a first material, the first sensor connecting part 250 may include a second material different from the first material.

Figure 35:
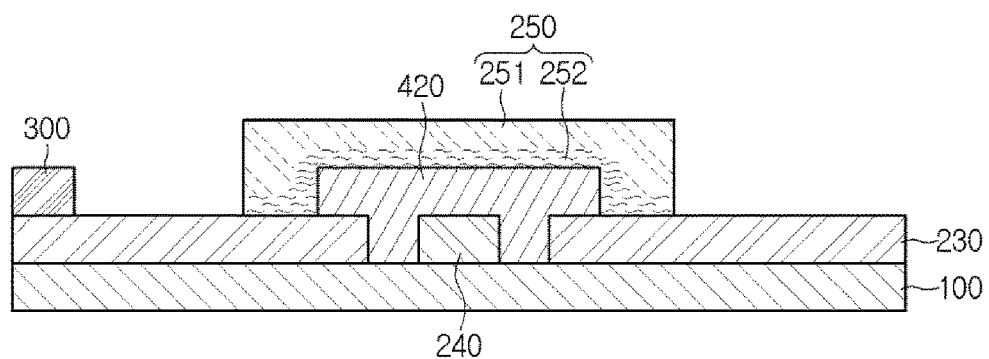
FIG. 35 is a sectional view taken along line II-II' of FIG. 34.

In detail, referring to FIG. 35, the first sensor connecting part 250 may include a base 251 and an electrode 252 provided in the base 251, and the electrode 252 may be provided at a lower portion of the base 251. The electrode 252 may include a nanowire. In this case, the second material may include a photosensitive nanowire film. The second material may be patterned through an exposure and development process.

The first and second sensor parts 230 and 240 may include a first material. In other words, the first and second sensor parts 230 and 240 may include a material that may be patterned through a scheme different from a patterning scheme for the first sensor connecting part 250.

Accordingly, after applying the first material, the first and second sensor parts 230 and 240 may be formed through the first patterning process, and the insulating part 420 may be formed on the first and second sensor parts 230 and 240. Then, after applying the second material on the resultant, the first sensor connecting part 250 may be formed through the second patterning process.

Figure 36:
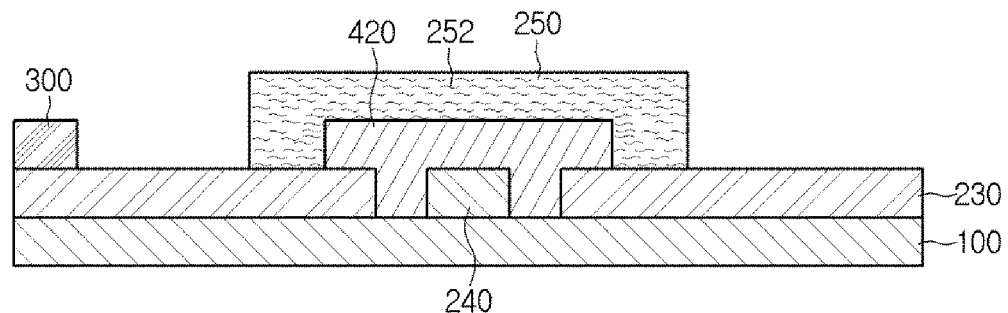
FIG. 36 is a sectional view showing the touch window according to another embodiment.

Meanwhile, referring to FIG. 36, the electrode 252 of the first sensor connecting part 250 may be provided on the entire portion of the first sensor connecting part 250.

Figure 37:
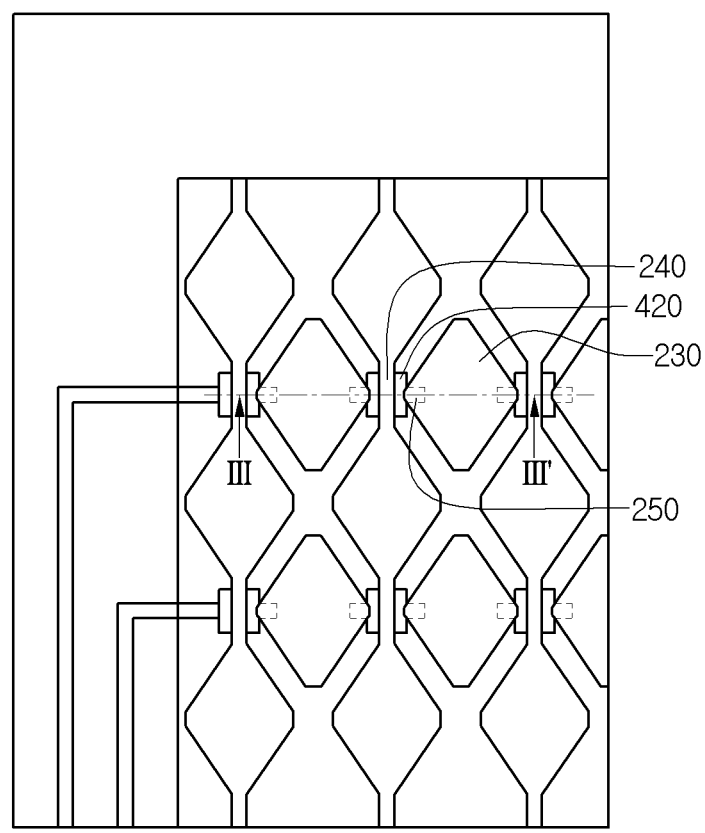
FIG. 37 is an enlarged view showing the touch window according to another embodiment.
Figure 38:
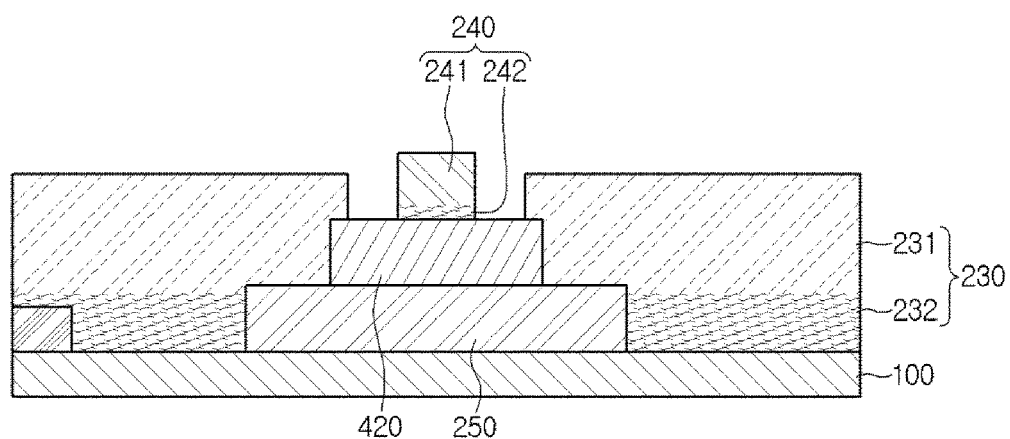
FIG. 38 is a sectional view taken along line III-III' of FIG. 37.
Figure 39:
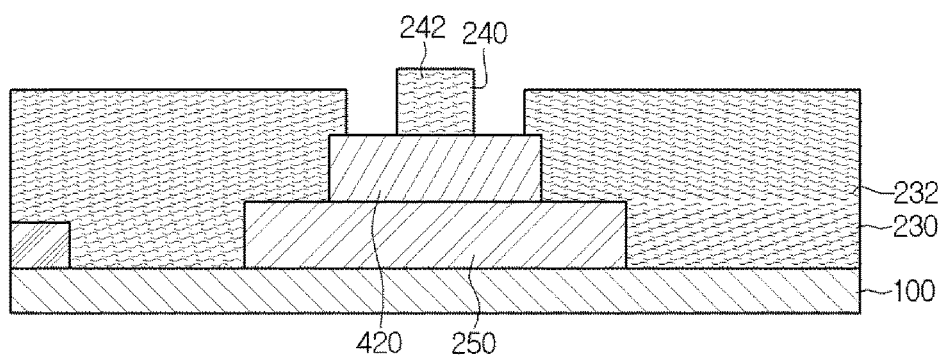
FIG. 39 is a sectional view showing the touch window according to another embodiment.

Referring to FIGS. 37 and 38, a touch window according to another embodiment may include the first sensor part 230, the first sensor connecting part 250, and the second sensor part 240.

The first sensor connecting part 250 is provided on the substrate 100. The first sensor connecting part 250 may directly make contact with the substrate 100.

The material constituting the first sensor connecting part 250 is different from materials constituting the first sensor part 230 and the second sensor part 240. Accordingly, when the first sensor connecting part 250 includes the first material, the first sensor part 230 and the second sensor part 240 may include the second material different from the first material.

The first and second sensor parts 230 and 240 may include the bases 231 and 241 and the electrodes 232 and 242 provided in the bases 231 and 241, and the electrodes 232 and 242 may be provided at the lower portions of the bases 231 and 241. The electrodes 232 and 242 may include nanowires. In this case, the second material may include a photosensitive nanowire film. The first material may be patterned through an exposure and development process.

The first sensor connecting part 250 may include the first material. In other words, the first sensor connecting part 250 may include a material that may be patterned through a scheme different from the patterning schemes for the first and second sensor parts 230 and 240.

Accordingly, after applying the first material, the first sensor connecting part 250 may be formed through the first patterning process, and the insulating part 420 may be formed on the first sensor connecting part 250. Then, after applying the second material on the resultant, the first and second sensor parts 230 and 240 may be formed through the second patterning process.

Meanwhile, referring to FIG. 36, the electrodes 232 and 242 of the first and second sensor parts 230 and 240 may be provided on the entire portion of the first and second sensor parts 230 and 240.

Hereinafter, a method of fabricating the touch window according to one embodiment will be described with reference to FIGS. 40 to 42. In particular, the second patterning process will be described below with reference to FIGS. 40 to 42.

Figure 40:
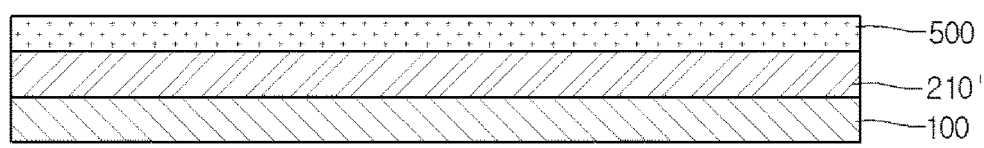
FIGS. 40 to 42 are sectional views to explain the method of fabricating the touch window according to one embodiment.

First, referring to FIG. 40, the electrode material 210' may be formed on the substrate 100. The electrode material 210' may include a photosensitive nanowire film. The electrode material 210' may be formed through a lamination process. Thereafter, the protective layer 500 may be formed on the electrode material 210'.

Figure 41:
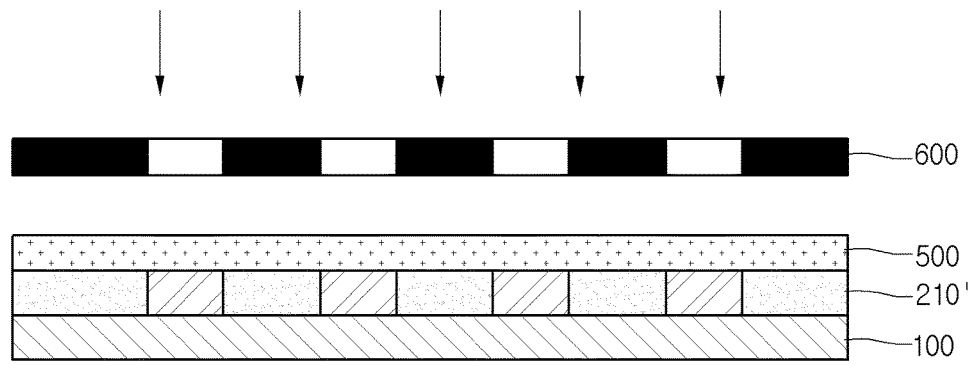

Thereafter, referring to FIG. 41, the mask 600 having a pattern to be formed is positioned on the substrate 100. An exposure process of irradiating an ultraviolet light onto the mask 600 may be performed to form the pattern.

Figure 42:

Thereafter, referring to FIG. 42, the protective layer 500 is removed and the electrode material 210' is developed, thereby forming the electrode part 210 having the pattern.

Figure 43:
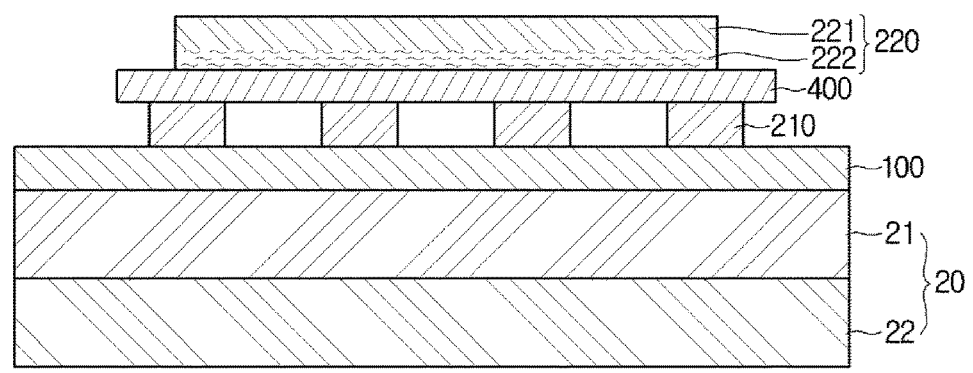
FIG. 43 is a sectional view showing a display assembled with the touch window according to the embodiment.

Thereafter, as shown in FIG. 43, the touch window 10 may be provided on the display panel 20 serving as the driving part. The touch window 10 and the display panel 20 are combined with each other, so that the touch window 10 and the display panel 20, which are combined with each other, constitute a display.

The display panel 20 has a display region on which images are output. The display panel applied to the display device may generally include upper and lower substrates 21 and 22. The lower substrate 22 may be provided on with a data line, a gate line, and a thin film transistor (TFT). The upper substrate 21 may be bonded to the lower substrate 22 to protect components provided on the lower substrate 22.

The display panel 20 may include various display panels depending on a type of the display according to the embodiment. In other words, the display according to the embodiment may include a liquid crystal display (LCD), a field emission display, a plasma display panel (PDP), an organic light emitting display (OLED), and an electrophoretic display (EPD). Accordingly, the display panel 20 may include various types of display panels.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A touch window comprising:
a substrate having an active area and an inactive area;

an electrode part provided on the active area of the substrate to detect a position; and a wire provided on the inactive area of the substrate to connect with the electrode part, wherein the electrode part comprises a base and an electrode on the base, wherein the base and the electrode have a same pattern, wherein the base comprises photosensitive material, wherein the electrode comprises a metallic nanowire, wherein the electrode part includes a first electrode unit extending in a first direction and a second electrode unit extending in a second direction crossing the first direction, wherein the first electrode unit and the second electrode unit are disposed on planes parallel to a plane on which the substrate is disposed, wherein an intermediate layer is disposed between the first electrode unit and the second electrode unit, wherein the intermediate layer comprises dielectric material;

wherein a total thickness of the substrate, the first electrode unit, the intermediate layer, and the second electrode unit is in a range of 90 μm to 110 μm;

wherein a base of the first electrode unit is directly in contact with the substrate, wherein a base of the second electrode unit is directly in contact with the intermediate layer, wherein the electrode of the first electrode unit is disposed between the intermediate layer and the base of the first electrode unit, wherein the wire includes a first wire connecting the first electrode part and a second wire connecting the second electrode unit, wherein the intermediate layer includes a hole, wherein the hole is formed only on the second wire, wherein a wire connecting part is disposed in the hole and at an end portion of the second electrode unit, wherein the second electrode unit is connected with the second wire through the wire connecting part, wherein an entire top surface of the intermediate layer is planar, and wherein an entire top surface of the second electrode unit is planar.

2. The touch window of claim 1, further comprising a cover window on the substrate.

3. The touch window of claim 1, wherein the electrode part has a thickness in a range of 1 μm to 6 μm.

4. The touch window of claim 1, wherein the electrode part has a thickness in a range of 2 μm to 5 μm.

5. The touch window of claim 1, wherein the base comprises a first base unit and a second base unit on the first base unit.

6. The touch window of claim 5, wherein the electrode is provided on the second base unit, and the electrode and the second base unit have a same pattern.

7. The touch window of claim 1, wherein the base includes the photosensitive material.

8. The touch window of claim 1, wherein the electrode has an interconnecting structure.

9. The touch window of claim 1, wherein the electrode part comprises a photo sensitive nanowire film.

10. The touch window of claim 1, wherein the electrode has concentrations of interconnecting structures that are higher when the interconnecting structures are more proximate toward a surface of the base.

11. The touch window of claim 1, wherein the electrode is provided within a distance of 1 μm from a surface of the base.

12. The touch window of claim 1, wherein the electrode is provided within a distance of 100 nm from a surface of the base.

13. A touch window comprising:

a substrate having an active area and an inactive area;

first and second electrode parts on the active area of the substrate;

a wire provided on the inactive area of the substrate to connect the first and second electrode parts;

an intermediate layer between the first and second electrode parts; and an electrode pad positioned at an end of the wire;

wherein the first and second electrode parts include materials different from each other, wherein one of the first and second electrode parts comprises metallic material, wherein the metallic material is provided in a shape of a mesh, wherein the other of the first and second electrode parts comprises photosensitive material and a metal nanowire provided in the photosensitive material, wherein the metal nanowire has a diameter in a range of 20 nm to 100 nm, wherein the metal nanowire is disposed at an area having a depth of 100 nm with respect to a lower portion or an upper portion of one of the first and the second electrode parts, wherein the wire includes a first wire connecting the first electrode part and a second wire connecting the second electrode part, wherein one of the first and second wires has a thickness greater than one of the first and second electrode parts, wherein the electrode pad is connected to a printed circuit board, wherein an entire top surface of the intermediate layer is planar, and wherein an entire top surface of the second electrode part is planar.

14. The touch window of claim 13, wherein the first and second electrode parts are formed on parallel planes.

15. The touch window of claim 13, wherein the first and second electrode parts are formed on mutually different planes.

16. The touch window of claim 15, wherein the intermediate layer has a thickness smaller than a thickness of the substrate, and wherein the intermediate layer has a thickness that is 0.05 times to 0.5 times greater than a thickness of the substrate.

17. A touch window comprising:

a substrate having an active area and an inactive area;

first and second electrode parts on the active area of the substrate;

a wire provided on the inactive area of the substrate to connect the first and second electrode parts, wherein the first electrode part comprises a first sensor part and a first sensor connecting part to connect with the first sensor part, wherein the second electrode part comprises a second sensor part, wherein the first sensor connecting part includes material different from materials of the first and second sensor parts, and wherein the first and second sensor parts each directly makes contact with the substrate; and an insulating part provided between the first sensor connecting part and the second sensor part, wherein the insulating part includes transparent insulating material, wherein the first sensor connecting part comprises photosensitive material and a metal nanowire provided in the photosensitive material, wherein the wire has a thickness smaller than that of the first sensor connecting part, wherein the first sensor connecting part includes a base and an electrode provided at a lower portion of the base, wherein the electrode includes the metal nanowire, wherein a top surface of the insulating part is planar, wherein the entire top surface of the insulating part contacts the first sensor connecting part, and wherein a top surface of the first sensor connecting part is planar.

18. The touch window of claim 17, wherein the insulating part includes metallic oxide or acrylic resin.

19. The touch window of claim 13, wherein the intermediate layer is provided in a space of the first electrode part.

20. The touch window of claim 1, wherein the wire is provided in a mesh pattern.

* * * * *